United States Patent
Matsumoto et al.

[11] Patent Number: 6,147,437
[45] Date of Patent: Nov. 14, 2000

[54] PRESSURE AND TEMPERATURE TRANSDUCER

[75] Inventors: Noriyuki Matsumoto, Yokohama; Yasuhiro Ohashi, Yamato; Martine Hori, Sagamihara, all of Japan

[73] Assignee: Schlumberger Technology Corporation, Sugar Land, Tex.

[21] Appl. No.: 09/371,992

[22] Filed: Aug. 11, 1999

[51] Int. Cl.[7] .................................................. H01L 41/08
[52] U.S. Cl. .......................... 310/338; 310/361; 310/367; 310/368; 73/703
[58] Field of Search .................................. 310/338, 361, 310/367–369; 73/702, 703

[56] References Cited

U.S. PATENT DOCUMENTS

| | | | |
|---|---|---|---|
| 3,561,832 | 2/1971 | Karrer et al. | 310/338 |
| 3,617,780 | 11/1971 | Benjaminson et al. | |
| 4,419,600 | 12/1983 | Sinha. | |
| 4,547,691 | 10/1985 | Valdois et al. | |
| 4,550,610 | 11/1985 | Eer Nisse | 310/338 X |
| 4,562,375 | 12/1985 | Besson et al. | 310/338 |
| 4,754,646 | 7/1988 | Eer Nisse | 310/338 X |
| 4,802,370 | 2/1989 | Eer Nisse | 310/338 X |
| 5,394,345 | 2/1995 | Berard et al. | |
| 5,471,882 | 12/1995 | Wiggins. | |

*Primary Examiner*—Mark O. Budd
*Attorney, Agent, or Firm*—Steven L. Christian

[57] ABSTRACT

A pressure and temperature transducer includes an elongate housing formed from double rotation cut crystal quartz, an elongate plate-like resonator formed from double rotation cut crystal quartz capable of vibrating under an applied electric field located within the housing, the resonator being formed in unitary construction with the housing. The long edges of the resonator are connected to the interior walls of the housing, and short edges of the resonator are free and extend across the interior of the housing in a substantially continuous curve. Electrodes are located on opposite faces of the resonator for applying an electric field which causes the resonator to vibrate. End caps, formed from double rotation cut crystal quartz, are provided at each end of the housing. A borehole tool includes a tool body which can be positioned in a borehole, a probe for sampling fluid in the borehole; and a pressure and/or temperature transducer, connected to the probe for making measurements on the fluid.

15 Claims, 4 Drawing Sheets

PRESSURE AND TEMPERATURE TRANSDUCER

TECHNICAL FIELD

The present invention relates to a pressure and temperature transducer, and in particular to a piezoelectric, dual mode transducer suitable for use in a borehole environment. The invention also provides a borehole tool incorporating such a transducer

BACKGROUND ART

Piezoelectric pressure and temperature transducers have been known for some time. Such transducers typically comprise a crystal resonator located inside a housing structure. Electrodes are placed on opposite sides of the resonator to provide a vibration-exciting field in the resonator. Environmental pressure and temperature are transmitted to the resonator via the housing and the stresses in the resonator alter the vibrational characteristics of the resonator, this alteration being sensed and used to interpret the pressure and/or temperature. U.S. Pat. No. 3,617,780 describes on form of such a transducer which comprises a unitary piezoelectric crystal resonator and housing structure in which the resonator is positioned on a median (radial) plane of the cylindrical housing. Crystal end caps are located at either end of the housing to complete the structure of the transducer. Since the vibration of the resonator is affected by both temperature and pressure, such devices can be difficult to use in environments where both vary in an uncontrolled manner. Such devices are known as single mode transducers.

One proposal to overcome this drawback of single mode transducers is described in U.S. Pat. No. 5,471,882. In this case and instrument is provided with two single mode transducers configured to have different temperature responses but similar pressure responses. By comparing the output of the two, the temperature effect can be cancelled. Another approach is to isolate one of the transducers from the environment to provide a reference against which the other can be calibrated.

The existence of multiple modes of thickness shear vibration in quartz has been know for some time. U.S. Pat. No. 4,419,600 proposes a stress compensated dual mode transducer. U.S. Pat. No. 4,547,691 and U.S. Pat. No. 5,394,345 describe dual-mode transducers, an example of which is shown in FIG. 1. The resonators in such transducers have two vibrational modes at different frequencies, known as C mode and B mode. C mode is responsive to both pressure and temperature variation whereas the B mode is primarily responsive to temperature, the effect of pressure being relatively small. The structure of the dual-mode transducer again has a unitary resonator and housing structure 10. However, in this case, the resonator 25 lies in an axial plane of the cylindrical housing 12, the ends 32, 33 of the resonator 25 being unconnected to the housing 12. Again, electrodes are located on opposite faces of the resonator 25 to excite the vibrational behaviour.

Pressure and temperature transducers such as these find uses in borehole measurement tools such as are used in oil or gas wells. One example is the MDT Modular Formation Dynamics Tester of Schlumberger.

One characteristic of oil and gas wells is that often relatively high temperatures and pressures are encountered. Transducers of the type described above can operate in many of these environments but ultimately degrade in performance or generally fail completely once a certain pressure or temperature is exceeded. Since this is generally terminal, the transducer in question must be replaced completely. The common failure mode of such transducers is known as "twinning" and occurs when certain pressure and temperature limits are exceeded. The failure is due to irreversible changes in the crystal structure of the quartz resonator. The temperature and/or pressure at which these changes take place are dependent on the particular design of the transducer in question.

It is an object of the present invention to provide a transducer which can be made to operate reliably in high temperatures and pressures.

DISCLOSURE OF INVENTION

The present invention provides a transducer comprising: an elongate housing, the exterior of which can be exposed to a pressure to be measured; an elongate plate-like resonator capable of vibrating under an applied electric field located inside the housing, long edges of the resonator being connected to interior walls of the housing, and short edges of the resonator extending between the walls, the shorts edges being substantially continuously curved between the interior walls.

One embodiment of the invention comprises a substantially cylindrical housing with a bi-convex cross section resonator located therein. The contact between the edges of the resonator and the inner walls of the housing extend for the whole length of the housing and the free edges of the resonator are formed with a concave curve. The general shape of the resonator can be considered as a "pinched" rectangle.

The term "substantially continuously curved" used in this documents covers both continuous curvature and two curved portions connected by a small straight section. The continuous curve can be of constant radius, or of varying radius such as oval.

The housing typically has open ends which are closed by end caps. The end caps can have interior cavities defined therein to allow the mechanical behaviour of the end cap and housing to be closely matched to reduce shear stresses across the joint.

The contact between the long edge of the resonators and the inner wall of the housing can extend for the full length of the housing or can terminate before the end of the housing. In half cases a generally symmetrical arrangement is preferred.

Many of the choices outlined above will depend upon the cut angles of the piezoelectric material of the resonator. The preferred material for the transducer of the invention is crystal quartz with a double rotation cut of angles $\phi=24°$, $\theta=33°$ ("WAD" cut).

A further aspect of the invention comprises a borehole tool including a transducer according to the invention. Such a tool comprises a tool body which can be positioned in a borehole, and means in the tool including the transducer for sampling a fluid pressure. The sampling means can include a probe to obtain fluid form the formation, and a chamber for holding a sampled fluid. The fluid in the borehole can also be sampled directly.

BEST MODE FOR CARRYING OUT THE INVENTION

The process for forming piezoelectric transducers from crystal quartz materials is well known in the art. Reference can be made to U.S. Pat. No. 4,547,691, U.S. Pat. No. 5,394,345, U.S. Pat. No. 3,617,780 and U.S. Pat. No. 5,471,882 for further information and background in constructing such transducers. In the following description dimensions will be given for illustration only, other dimensions being possible while still embodying this invention.

Figure 1:
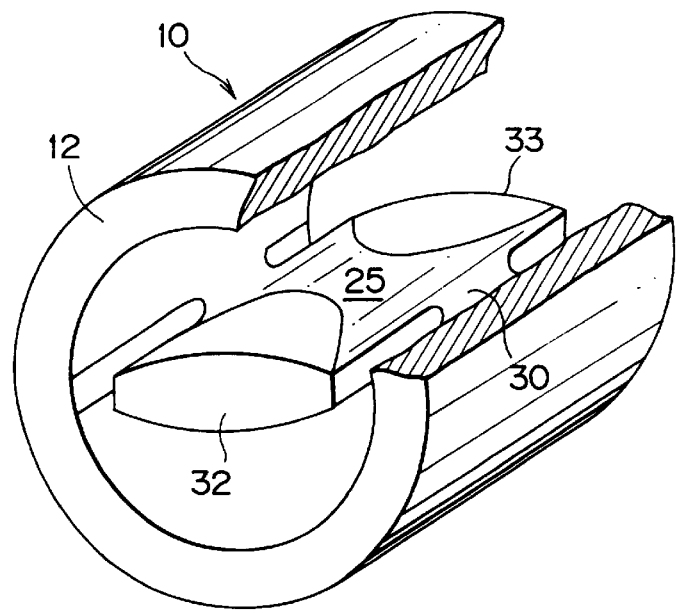
FIG. 1 shows a plan view of a resonator for a prior art transducer.
Figure 2:
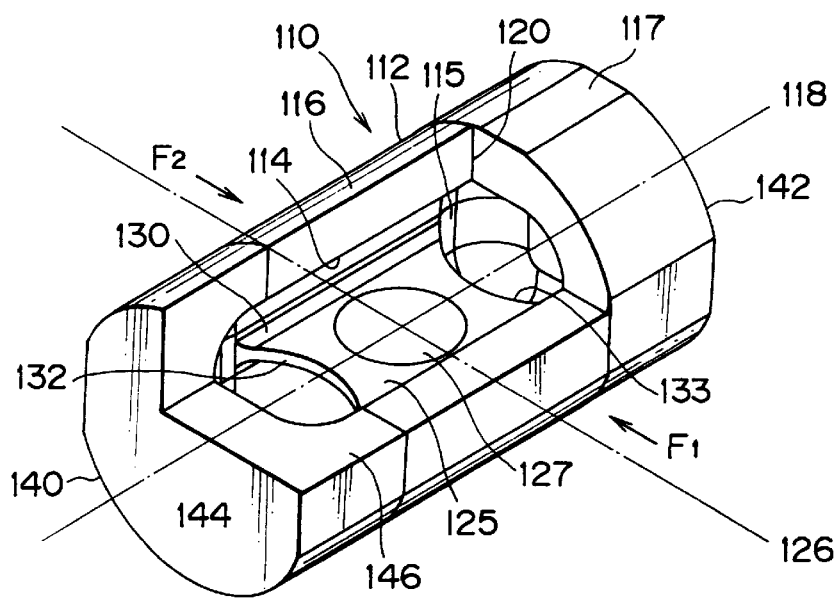
FIG. 2 shows a transducer according to one embodiment of the invention.
Figure 3:
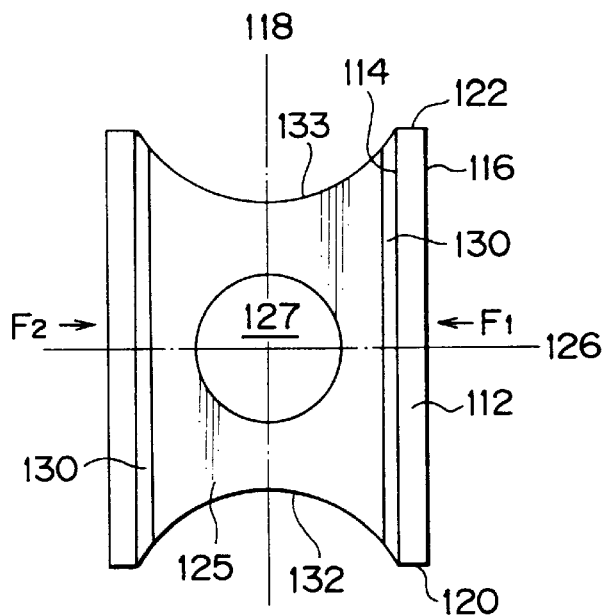
FIG. 3 shows a plan view of the resonator section of the transducer of FIG. 2.

In one embodiment of the invention as is shown in FIGS. 2 and 3, a transducer 110 comprises a tubular housing 112 having inner and outer walls 114 and 116. The housing 112 has a generally circular cross section with flats 115, 117 disposed at 90° around the structure in the inner and outer walls 114, 116. The end faces of the housing 112 are flat surfaces 120 and 122 to which end caps 140, 142 are attached (see below). Located inside the housing 112 and parallel to its long axis 118 is located a plate 125 forming a resonator element. In plan view, this plate 125 has a pinched rectangular form with its long sides being straight and parallel to the axis 118. The plate 125 has a symmetrical bi-convex cross section with electrodes 127 positioned on opposite faces. This makes it possible, when the plate 125 is subjected to an applied electric field from the electrodes 127 which causes it to resonate, to trap the energy maintaining the vibration (it is to be noted that bi-planar or plano-convex cross sections can be used in certain circumstances). The short, free edges of the plate are formed as concave curves 132, 133 having a constant radius of curvature between the contact point with the inner wall 114 of the housing 112. Each of long edges of the resonator is connected by a connecting bridge 130 respectively to a respective zone of the internal wall 114 of the housing 112. The connecting bridges 130 are radiussed between the resonator plate 125 and wall 114. The point of intersection of the free edges 132, 133 with the housing 112 is at the respective end face 120, 122 of the housing 112, in other words, the housing 112 does not project beyond the furthest extent of the resonator plate 125. However, an alternative embodiment can have the resonator end faces contacting the housing some small distance from the end (see the description of FIG. 4 below). This feature is dependent on the particular design of end cap used. The assembly of this element, the plate 125 and the connecting bridges 130 is of unit construction and cut in the same crystal block using a double-rotation cut which will be described further below.

In use, when the outer surface 116 of the element 112 is subjected to a pressure, these bridges 130 transmit two equal and opposite forces F1 and F2 on the same application line parallel to the plane 126 perpendicular to the axis 118 and located substantially in the middle of the longitudinal dimension of the resonator plate 125.

In its assembled structure, the transducer 110 has two terminal caps or end pieces such as 140, 142 which are applied on the end faces 120 and 122 of the housing 112 and secured thereto by gluing, for example using a glass frit. The end caps 140, 142 comprise substantially flat base sections 144 with an upstanding wall 146 around the periphery thereof. The end caps 140, 142 are of unitary construction, made from quartz in the same manner as the resonator section 112. The cut angle of the quartz in the end caps 140, 142 is aligned with that of the resonator section 112. Furthermore, the height of the wall is arranged such that the shear stresses across the joint 150 between the end cap 140, 142 and resonator section 112 are minimised as much as possible.

In the present case, double rotation cut quartz is used having $\phi=24°$, $\theta=33°$ ("WAD cut"). It is possible that other cuts might also be appropriate, for example $\phi=21.93°$, $\theta=33.93°$ ("SC cut"), $\phi=16.3°$, $\theta=34.5°$ ("SBTC cut"), $\phi=30°, \theta=34°$ ("X+30° cut"), or any other cut which provides suitable piezo-electric vibration behaviour. The crystal quartz used to form the transducer can be either natural or synthetic.

Figure 4:
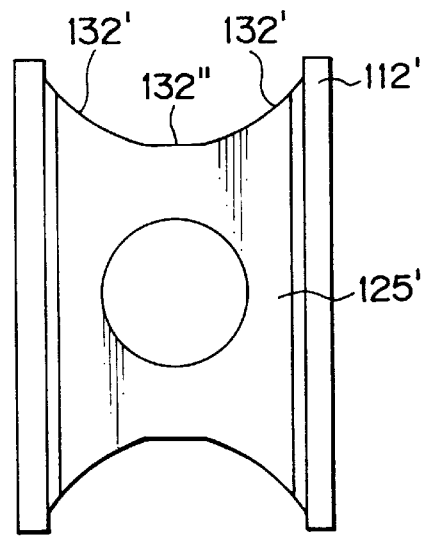
FIG. 4 shows a plan view of an alternative embodiment of a resonator for use in a transducer according to the invention.

The embodiment described above shows a continuous curve in the end wall 132, 133 of the resonator plate 125. It is also possible that the end wall could be formed with two curved portions 32' connecting with the inner wall 114' of the housing 112' joined by a relatively short straight section 132" as is shown in FIG. 4 Alternatively a combination of curves could be used. The object of this construction, as well as that shown in FIG. 2, is to minimise stress concentrations where the resonator plate 125, 125' joins the housing 112, 112' since this is the common failure areas at high temperature and pressure.

Also in FIG. 4, it will be seen that the housing 112' extends beyond the ends of the curved edges 132' of the resonator plate 125', unlike that shown in FIGS. 2 and 3. This feature, as with the height of the end cap wall 146, affects the degree of stress across the joint 150 between the end cap 142, 144 and the housing 112.

Figure 5:
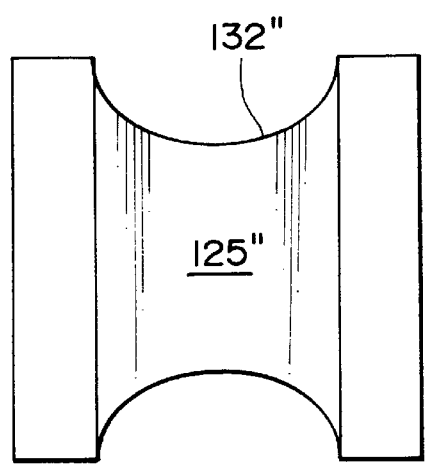
FIG. 5 shows a plan view of an alternative embodiment of a resonator for use in a transducer according to the invention.

FIG. 5 shows yet another embodiment of the resonator 125", in which the curved edges 132"are in a continuous curved formed as a half-oval shape rather than the circular arc or constant radius curvature shown in FIGS. 2 and 3.

It will be appreciated that several parameters of the resonator can be varied while still staying within the scope of the invention. For example the general dimensions can be selected to take into account limitations on the available space in the environment in which the transducer is to be used. Also, details such as the size of the resonator plate within the housing and the radius of curvature of the edges of this plates can be chosen according to requirements. While the actual measurements chosen for such features may affect the frequencies at which the resonator vibrates, or the sensitivity or range of the transducer, the general principle of operation of the transducer remains the same and the benefit of the present invention over the prior art construction can be observed.

Figure 6:
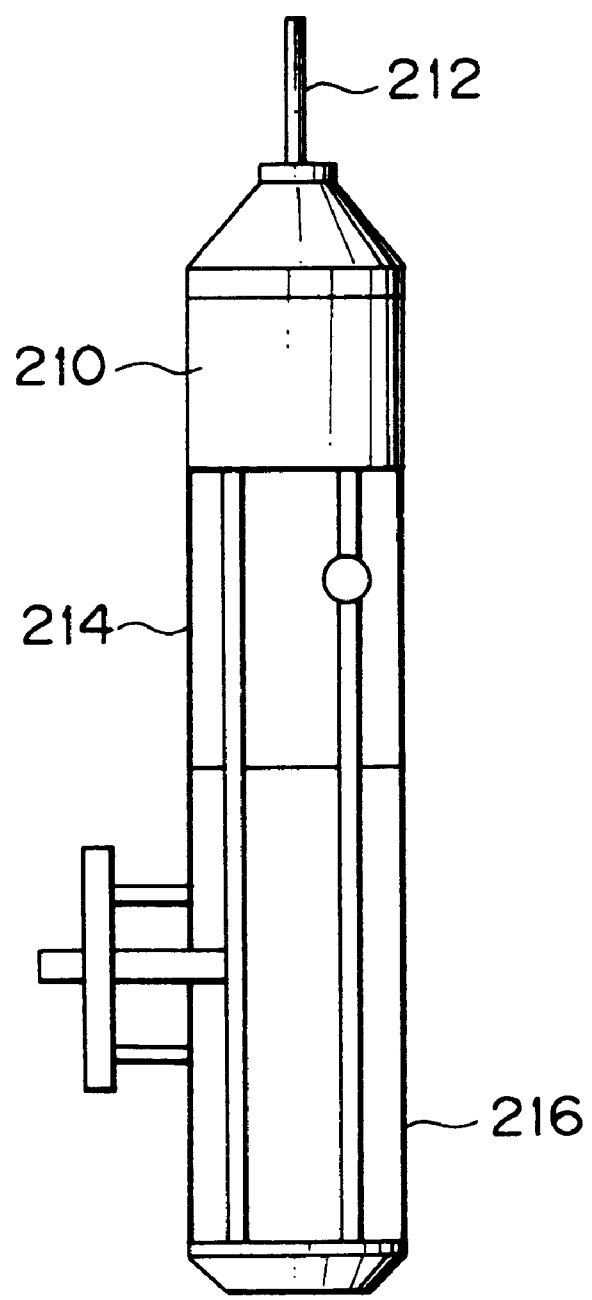
FIG. 6 shows a borehole tool incorporating according to a further aspect of the invention incorporating a transducer as shown in FIG. 2.
Figure 7:
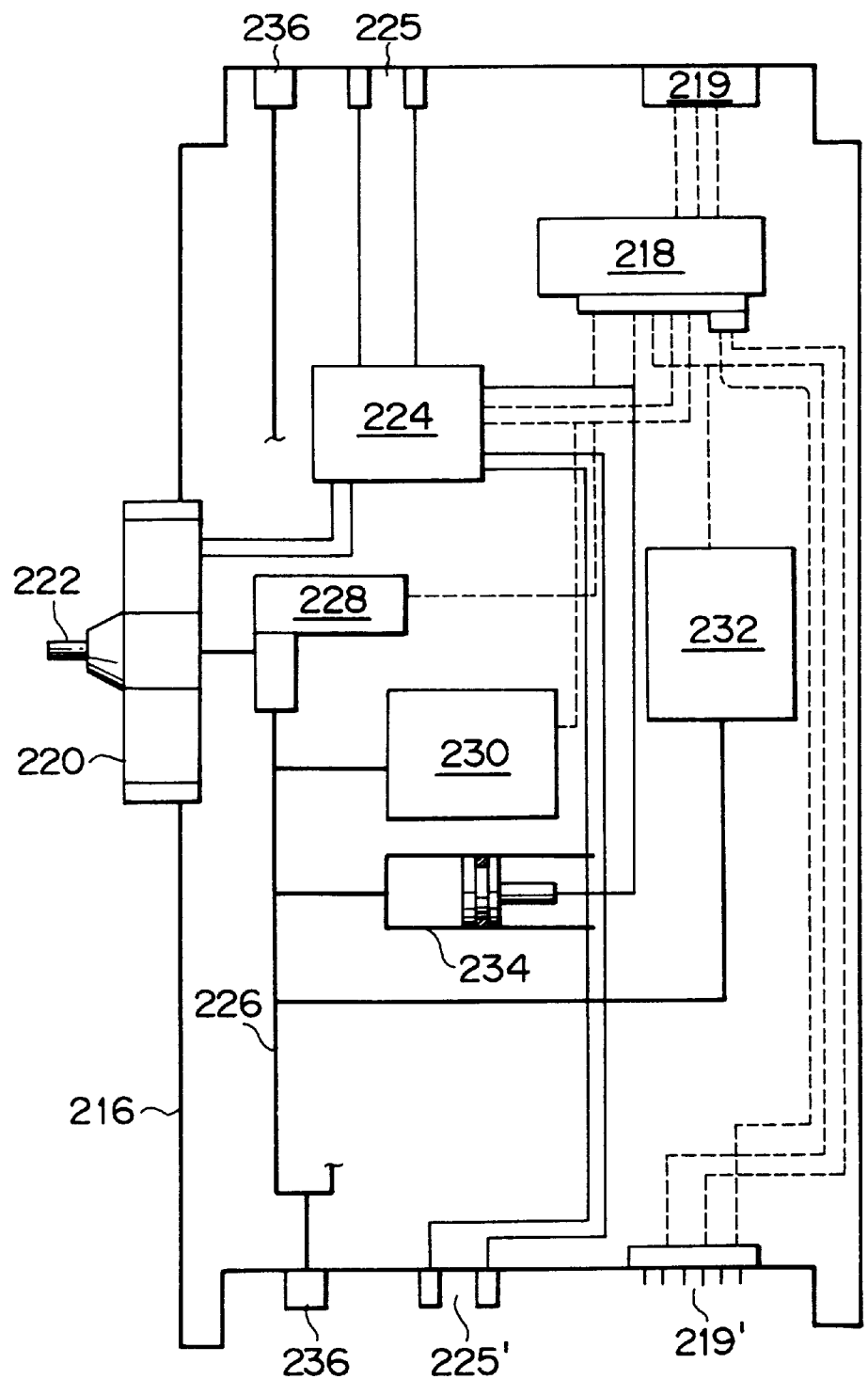
FIG. 7 shows a parts of the tool shown in FIG. 6 incorporating the transducer.

FIG. 6 shows a borehole tool which incorporates a transducer of the type described above. The tool corresponds in configuration to the reservoir pressure configuration of Schlumberger's MDT (Modular Formation Dynamics Tester) tool, and comprises and electric power module and telemetry system 210 which connects to a logging cable 212 which is connected to surface equipment (not shown), a hydraulic power module 214 and a probe module 216. Basic details of the probe module 216 are shown in FIG. 7 and will be described in more detail below. The power module 210 converts electrical power supplied from the surface (via the logging cable) to a form suitable for the tool electronics and electrically operated devices. The hydraulic power module contains a hydraulic pump drive by an electric motor and an accumulator (not shown) and provides hydraulic power to the probe module 216. Other modules can be included in the tool such as further probe modules, sample modules and packer modules. These are not described here both for reasons of clarity and because they do not materially affect the operation or the use of the transducer described above.

The probe module 216 includes an electronics controller 218 which connects 219 to the electric power module 212 and through 219' to other modules (not shown), if present. A probe 220 is provided in the side of the probe module 216 and includes a formation sampling probe 222 which can be driven into the formation when the tool is in position in the borehole. Actuation of the sampling probe is effected under the control of a hydraulic control circuit 224 which is connected 225 to the hydraulic power module 214 and through 225' to other modules (not shown) if present. The hydraulic control circuit 224 is also connected to the electronics controller 218. When the sampling probe 222 is forced against the formation, formation fluid can pass into a sampling circuit 226 which allows fluid into the module 216. The resistivity and temperature of the formation fluid can be measured in a resistivity cell 228 and pressure measured by a strain gauge 230 and a pressure transducer 232. The pressure transducer 232 comprises one embodiment of the invention as described above in relation to FIG. 2. The sampling circuit 226 also includes a pretest chamber 234 which allows samples to be drawn form the formation under controlled conditions. The sampling circuit 226 can be connected to a common tool sampling circuit 236 which can connect through to other modules (not shown) such as sample modules for retaining formation fluid samples for further testing, either downhole or at the surface.

What is claimed is:

1. A transducer comprising:
    a) an elongate housing, the exterior of which can be exposed to a pressure to be measured; and
    b) an elongate plate-like resonator capable of vibrating under an applied electric field located within the housing and connected across interior walls, wherein long edges of the resonator are connected to the interior walls of the housing, and short edges of the resonator are free and extend across the interior of the housing in a substantially continuous curve.

2. A transducer as claimed in claim 1, wherein the housing is substantially cylindrical in cross section.

3. A transducer as claimed in claim 1, wherein end caps are connected to opposite ends of the housing to define an interior cavity.

4. A transducer as claimed in claim 1, wherein the housing and resonator are of unitary construction.

5. A transducer as claimed in claim 3 wherein each end cap is of unitary construction.

6. A transducer as claimed in claim 1, wherein the sort edges of the resonator contact the housing at the ends thereof.

7. A transducer as claimed in claim 1, wherein the short edges of the resonator contact the housing intermediate the ends thereof.

8. A transducer as claimed in claim 1, wherein electrodes are positioned on opposite faces of the resonator.

9. A transducer as claimed in claim 5, wherein the resonator and housing, and the end caps are all formed from double rotation cut crystal quartz.

10. A transducer comprising:
    a) an elongate housing formed from double rotation cut crystal quartz, the exterior of which can be exposed to a pressure to be measured;
    b) an elongate plate-like resonator formed from double rotation cut crystal quartz capable of vibrating under an applied electric field located within the housing and connected across interior walls, wherein the resonator is formed in unitary construction with the housing and wherein long edges of the resonator are connected to the interior walls of the housing, and short edges of the resonator are free and extend across the interior of the housing in a substantially continuous curve;
    c) electrodes located on opposite faces of the resonator for applying an electric field which causes the resonator to vibrate;
    d) end caps formed from double rotation cut crystal quartz provided at each end of the housing to define a cavity therein.

11. A borehole tool comprising:
    a) a tool body which can be positioned in a borehole;
    b) sampling means for obtaining a fluid to be sampled; and
    c) a transducer, associated with the sampling means, for measuring fluid pressure, the transducer comprising:
        i) an elongate housing, the exterior of which can be exposed to a pressure to be measured; and
        ii) an elongate plate-like resonator capable of vibrating under an applied electric field located within the housing and connected across interior walls, wherein long edges of the resonator are connected to the interior walls of the housing, and short edges of the resonator are free and extend across the interior of the housing in a substantially continuous curve.

12. A tool as claimed in claim 11, wherein the sampling means comprises a probe for sampling fluid in the borehole, the transducer being connected to the probe.

13. A tool as claimed in claim 12, wherein the probe samples fluid from a formation surrounding the borehole in which the tool is positioned.

14. A tool as claimed in claim 11, further comprising at least one sampling chamber.

15. A tool as claimed in claim 11 further comprising other sensor form making measurements on the sampled fluid.

* * * * *